L. H. ADAMSON.
DEVICE FOR PULLING AUTOMOBILES FROM MUD HOLES.
APPLICATION FILED JAN. 21, 1916.
1,219,210. Patented Mar. 13, 1917.
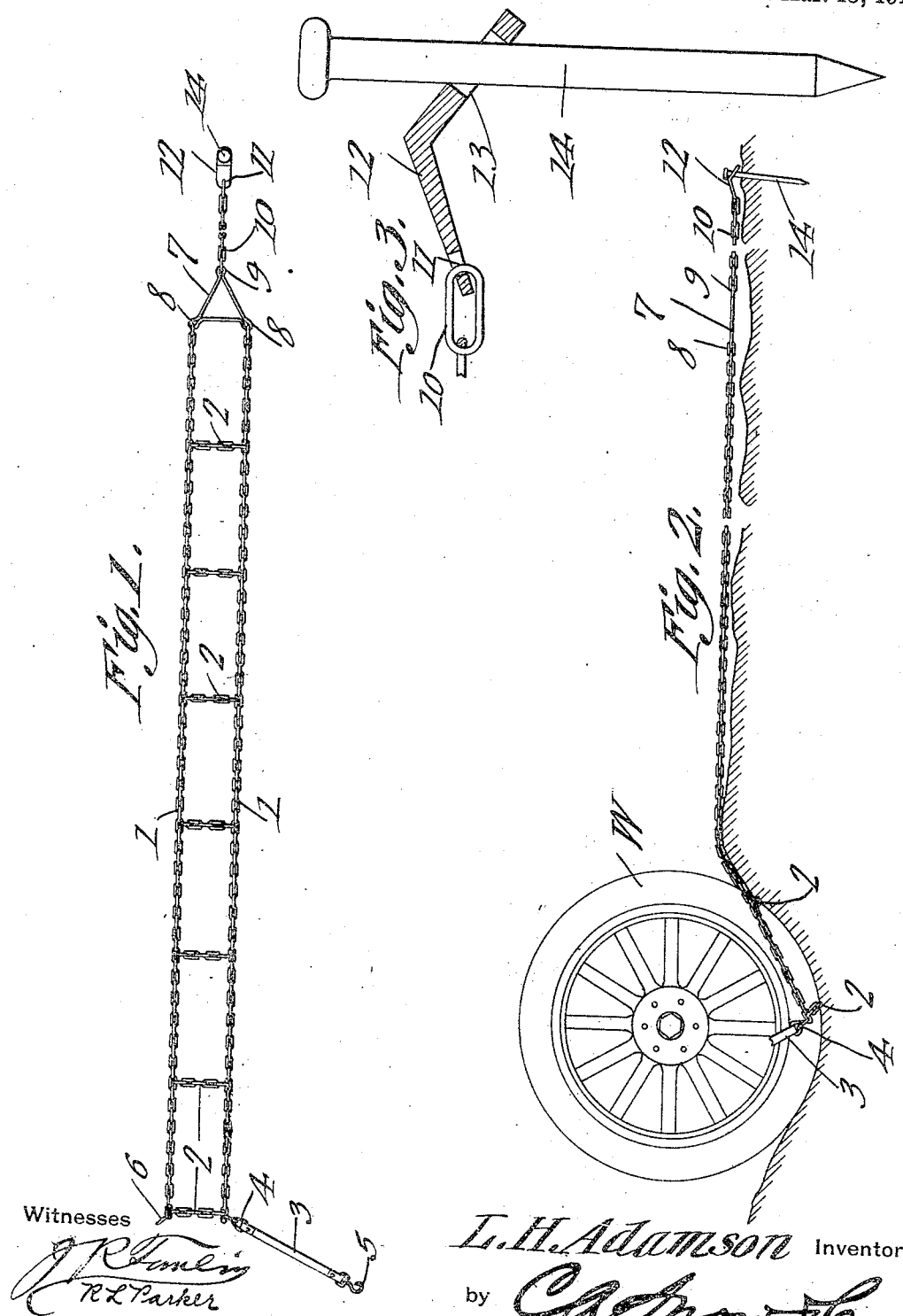
L. H. Adamson Inventor

UNITED STATES PATENT OFFICE.

LEE H. ADAMSON, OF ROGERS, ARKANSAS.

DEVICE FOR PULLING AUTOMOBILES FROM MUD-HOLES.

1,219,210.  Specification of Letters Patent.  Patented Mar. 13, 1917.

Application filed January 21, 1916. Serial No. 73,403.

*To all whom it may concern:*

Be it known that I, LEE H. ADAMSON, a citizen of the United States, residing at Rogers, in the county of Benton and State of Arkansas, have invented a new and useful Device for Pulling Automobiles from Mud-Holes, of which the following is a specification.

The present invention appertains to devices for extracting automobiles or motor vehicles from mud holes or ruts in bad roads, and aims to provide a simple, inexpensive and handy device of that character, which can be carried in the tool kit or other receptacle, and which can be readily applied to the rear driving wheel of the machine whereby said wheel can be extracted out of a mud hole or rut.

The present device has improved details of construction to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the device.

Fig. 2 is a side elevation thereof as in use.

Fig. 3 is an enlarged sectional view of the gripping member which engages the anchor pin.

The present device embodies a pair of longitudinal parallel chains 1 of suitable construction, or other flexible elements which are connected at suitable intervals by cross tie chains or flexible elements 2 of sufficient length, that when the chains 1 are wound upon the rear wheel W of an automobile, the chains 1 rest against the opposite sides of the tire, thus holding the device in place upon the wheel. The rear ends of the chains 1 are connected by a cross tie chain 2, and a strap or flexible element 3 is connected at one end by links 4 with the rear end of one chain 1, and a hook 5 is attached to the free end of said strap 3 to engage a ring or loop 6 attached to the rear end of the other chain 1. The rear cross tie chain 2 and strap 3 provide means for embracing the tire and felly of the rear wheel, the strap 3 being pressed upon the inner side of the felly behind one of the spokes, in attaching the present device to the wheel, and the hook 5 being engaged with the ring 6, so that the chains 1 are anchored to the periphery of the wheel. The chains 1 can be attached to the forward side of the wheel above the mud, since the wheel in turning will carry the strap 3 and rear ends of the chains 1 downward and rearward until the chains 1 are drawn taut, as seen in Fig. 2.

In order to anchor the forward ends of the chains 1 to the road and a distance ahead of the wheel W, a triangular coupling member or link 7 has loops 8 at its rear corners with which the forward ends of the chains 1 are engaged, and has a loop 9 at its forward corner with which the rear end of a chain or flexible element 10 is engaged. The coupling member 7 thus provides effective and convenient means for attaching the chain 10 and chains 1 together. The forward end of the chain 10 which may be of any suitable length, is engaged with the aperture 11 in the rear end of an angular attaching member 12, the arms which are arranged at an obtuse angle relative to one another with the elbow projecting upwardly. The forward arm of the member 12 has an aperture 13 whose walls are perpendicular with said arm, and an anchor pin 14 can be inserted downwardly through the aperture 13 to be driven into the ground, which will anchor the device in place.

The present device when not in use can be stored within small encompass in a tool kit or other receptacle, and can be readily applied, as above indicated, so that when the wheel W is in a mud hole or rut, the device in being applied will enable the machine to extract itself from the rut, the wheel W running upon the present device and winding the same thereon to pull the wheel out of the hole. One of the devices can be used for each of the rear wheels, if desired, although this may not be necessary.

Attention is directed to the fact that the attaching member 12 can drop down the pin 14 onto the ground, and when the rearward pull or strain is applied to the member 12, it is swung to gripping or binding position, the diagonally opposite corners of the aperture 13 biting the pin 14, as seen in Fig. 3. It will be noted that the anchor pin 14 cannot swing rearwardly relative to the member 12, with the member 12 in the position illustrated in Fig. 3, and this will reduce to a minimum the liability of the pin bending rearwardly under the strain should the pin not be driven a considerable distance into the ground. The pin 14 is therefore held perpendicular to the ground, and even though the pin is not driven into the ground a considerable distance, the pin is not liable to be drawn loose. This feature is of advantage when the ground is hard and the pin cannot be driven deep into the same.

The chains 1 and coupling member 7 are preferably detachable, and the strap 3 is also preferably detachable from the chains, whereby a plurality of the flexible elements can be connected together, or whereby an ordinary anti-skid chain can be attached to the present structure to form a continuation thereof. This enables the device to be used in conjunction with anti-skid chains now employed upon tires.

Having thus described the invention, what is claimed as new is:

A device of the character described comprising a flexible structure adapted for attachment to an automobile driving wheel to be wound thereon, an anchor pin adapted to be driven into the ground, and an attaching member having arms arranged at an obtuse angle relative to one another, the rear arm of said member being connected to the forward end of said structure, and the forward arm of said member having an aperture for the reception of said pin, the walls of said aperture being perpendicular with said forward arm to provide corners for gripping said pin.

In testimony that I claim the foregoing as my own, I have hereto affixed my signature in the presence of two witnesses.

LEE H. ADAMSON.

Witnesses:
W. A. O. JONES,
E. W. HOMAN.